US009863649B2

(12) United States Patent
Carlyon

(10) Patent No.: US 9,863,649 B2
(45) Date of Patent: Jan. 9, 2018

(54) DUAL BYPASS DIRECT FIRED HEATING SYSTEM WITH PRESSURE CONTROL

(71) Applicant: MITEK HOLDINGS, INC., Wilmington, DE (US)

(72) Inventor: Zeke Carlyon, Vassar, MI (US)

(73) Assignee: MITEK HOLDINGS, INC., Wilmington, DE (US)

( * ) Notice: Subject to any disclaimer, the term of this patent is extended or adjusted under 35 U.S.C. 154(b) by 144 days.

(21) Appl. No.: 13/834,950

(22) Filed: Mar. 15, 2013

(65) Prior Publication Data

US 2014/0261370 A1    Sep. 18, 2014

(51) Int. Cl.
| F24D 19/10 | (2006.01) |
| F24D 5/10 | (2006.01) |
| F24H 3/02 | (2006.01) |

(52) U.S. Cl.
CPC ........... *F24D 19/1084* (2013.01); *F24D 5/10* (2013.01); *F24H 3/025* (2013.01)

(58) Field of Classification Search
CPC ...... F23N 3/02; F23N 2035/06; F24H 3/0488; F24H 3/025; F24H 9/0063; F24H 9/0068; F24H 9/1881; F24H 9/2085; F23L 3/00; F23C 2203/30; F23D 2208/005
USPC ........ 126/99 R, 106, 110 A, 110 AA, 110 B, 126/110 C, 112, 116 A, 116 R; 236/1 A, 236/11, 15 B, 15 C, 15 D; 431/8, 12, 19; 432/19, 24, 26, 47, 48, 55, 56; 454/229, 454/238
See application file for complete search history.

(56) References Cited

U.S. PATENT DOCUMENTS

| 144,355 | A | * | 11/1873 | Pfund | ........................ 126/99 R |
| 1,949,735 | A | * | 3/1934 | Bulkeley | ....................... 165/249 |
| 2,712,927 | A | * | 7/1955 | Blum | ............................. 165/222 |
| 3,199,848 | A | * | 8/1965 | Harrison | ........................ 432/49 |
| 3,398,940 | A | * | 8/1968 | Kosarin | ............. F24D 19/1084 |
| | | | | | 432/176 |
| 3,417,977 | A | * | 12/1968 | Nelson | .................... F23N 1/025 |
| | | | | | 432/176 |

(Continued)

OTHER PUBLICATIONS

"Orthogonal Projections" Chapter 8.1 http://www.math4all.in/public_html/linear%20algebra/chapter8.1.html retrieved Sep. 19, 2016.*

(Continued)

*Primary Examiner* — Alissa Tompkins
*Assistant Examiner* — Deepak Deean
(74) *Attorney, Agent, or Firm* — Senniger Powers LLP

(57) ABSTRACT

A burner box for use in an air handling system. The burner box includes a main body having a top wall, a bottom wall, side walls extending between the top and bottom walls, and intermediate walls extending between the top and bottom walls and positioned between the side walls. An open upstream end of the main body is divided by the intermediate walls into a first bypass opening and a second bypass opening spaced from the first bypass opening by a burner opening. A direct fired burner is positioned in the main body between the intermediate walls and adjacent the burner opening such that air drawn into the main body through the burner opening is directed over the direct fired burner for heating. An electronic control system is operatively connected to the burner box and configured to maintain a constant pressure difference across the direct fired burner.

12 Claims, 10 Drawing Sheets

(56) References Cited

U.S. PATENT DOCUMENTS

| | | | | |
|---|---|---|---|---|
| 3,591,150 | A | * | 7/1971 | Weatherston .................... 432/47 |
| 3,635,245 | A | * | 1/1972 | Canfield ........................ 137/607 |
| 4,294,403 | A | * | 10/1981 | Ammons et al. ............... 236/13 |
| 4,573,912 | A | * | 3/1986 | Albritton et al. ............. 432/222 |
| 4,674,475 | A | * | 6/1987 | Powis ....................... 126/110 C |
| 4,724,516 | A | * | 2/1988 | Day et al. ......................... 700/1 |
| 4,829,447 | A | | 5/1989 | Parker et al. |
| 4,917,074 | A | * | 4/1990 | Brekke ................ F24H 3/0488 |
| | | | | 126/110 A |
| 5,257,958 | A | | 11/1993 | Jagers |
| 5,290,188 | A | * | 3/1994 | Kiser ..................... F24F 3/044 |
| | | | | 126/110 AA |
| 5,597,354 | A | | 1/1997 | Janu et al. |
| 5,915,960 | A | | 6/1999 | Check et al. |
| 6,629,523 | B2 | * | 10/2003 | Saltzman et al. ......... 126/110 C |
| 7,059,536 | B2 | * | 6/2006 | Schneider ............ F24F 11/0001 |
| | | | | 237/2 A |
| 9,115,911 | B2 | * | 8/2015 | Desi-Seulean .......... F23D 14/20 |
| 2004/0072535 | A1 | * | 4/2004 | Schneider ............ F24F 11/0001 |
| | | | | 454/229 |
| 2006/0266348 | A1 | * | 11/2006 | Jauch et al. .............. 126/110 C |
| 2010/0024794 | A1 | * | 2/2010 | Desi-Seulean .......... F23D 14/20 |
| | | | | 126/110 B |
| 2010/0294257 | A1 | * | 11/2010 | Thayer et al. ............ 126/116 R |
| 2012/0222851 | A1 | * | 9/2012 | Arinez .................... F24F 13/12 |
| | | | | 165/247 |
| 2014/0373826 | A1 | * | 12/2014 | Cote ................... F24D 19/1084 |
| | | | | 126/110 A |

OTHER PUBLICATIONS

"Dot Products of Vectors" http://thejuniverse.org/PUBLIC/LinearAlgebra/LOLA/dotProd/proj.html retrieved Sep. 19, 2016.*
"Sections 6.1 : Orthogonality" http://www.math.uri.edu/~jbaglama/classes/2003-2004/spring/math215/lecture17/lecture6.11.html retrieved Sep. 19, 2016.*
"Section 4.1 Orthogonal subspaces" http://www.ms.uky.edu/~carl/ma322/wqshmwk/chap4a/notes41.html retrieved Sep. 19, 2016.*
Mexican Office action for Application No. MX/a/2014/003193 with English translation, dated May 23, 2016, 7 pages.
Canadian Examination Report for Application No. 2,845,944, dated Mar. 11, 2016, 5 pages.
Mexican Office action for Application No. MX/a/2014/003193 with English translation, dated Nov. 4, 2016, 7 pages.
Mexican Office action for Application No. MX/a/2014/003193 with English translation, dated Jun. 22, 2017, 11 pages.

* cited by examiner

DUAL BYPASS DIRECT FIRED HEATING SYSTEM WITH PRESSURE CONTROL

FIELD OF THE INVENTION

The present invention generally relates to a heating system, and more specifically, to a direct fired burner heating system with pressure control.

BACKGROUND OF THE INVENTION

Direct gas-fired heating systems provide heated air to buildings by drawing fresh air in from outside the building and heating it to make up for the loss of heated inside air through open doors, exhaust fans, etc. A recirculating direct fired heating system mixes the heated outside air with recirculated inside air before delivering the mixture to the building. The heating system is configured to maintain a selected air pressure and temperature inside the building. For the direct fired heating system to function properly, the air stream over the direct fired burner must be maintained at a constant mass flow rate, which requires that the pressure differential across the burner be maintained at a relatively constant level. If the pressure drop across the burner is too high or too low, the flame from the burner might be too long and risk burning system components, or the air pressure will extinguish the burner flame. In conventional recirculating systems, dampers control the relative amounts of air flow between the recirculated or return air and the outside or make-up air. The systems are set to supply a certain volume of air to the building, and the dampers are positioned so that the return air and the outside air combine to supply the set volume. Conventionally, the dampers for the return air and the outside air are linked either mechanically or electronically so an adjustment to one causes an equal and opposite adjustment in the other. However, this control system does not measure the pressure drop across the burner or maintain a precise targeted pressure difference for optimizing operation of the burner, nor does it allow for changes to the volume of air supplied to the building. One pressure control solution suggested by the prior art is to have a passive damper for regulating the pressure drop across the burner. However, this system cannot keep up with the pressure changes across the burner, and thus the pressure differential is not maintained with sufficient precision. This system also cannot maintain the burner pressure differential when the total air volume changes. There is a need for a direct fired burner heating system that more precisely maintains an optimal flow rate over the burner.

SUMMARY OF THE INVENTION

In one aspect, a burner box for use in an air handling system for conditioning air in a building, the air handling system being operable to draw outside air into the system from an outside environment and operable to draw return air into the system from the building, includes a main body. The main body has a top wall, a bottom wall, side walls extending between the top and bottom walls, and intermediate walls extending between the top and bottom walls and positioned between the side walls. The main body defines an open upstream end and an open downstream end. The open upstream end is divided by the intermediate walls into a first bypass opening and a second bypass opening spaced from the first bypass opening by a burner opening. A direct fired burner is positioned in the main body between the intermediate walls and adjacent the burner opening, such that air drawn into the main body from the outside environment through the burner opening is directed over the direct fired burner for heating.

In another aspect, a heating system for use in conditioning air in a building by supplying air to a duct system of the building includes an enclosure. The enclosure has an outside air opening for drawing outside air into the enclosure and a return air opening for drawing return air from within the building into the enclosure. A burner box is positioned in the enclosure adjacent the outside air opening such that air flowing into the enclosure through the outside air opening must pass through the burner box. The burner box includes a direct fired burner for heating at least a portion of air flowing through the outside air opening and flowing over the direct fired burner. The direct fired burner is configured for optimized operation at a predetermined target pressure difference across the burner. An electronic control system is operatively connected to the burner box and is configured to measure a pressure differential across the direct fired burner and adjust the burner air flow to adjust the pressure differential to achieve the predetermined target pressure difference for optimizing operation of the direct fired burner.

In yet another aspect, a method for maintaining a constant pressure difference across a direct fired burner includes measuring a pressure differential across a direct fired burner. The measured pressure differential is compared to a predetermined target pressure difference. The pressure differential across the direct fired burner is adjusted by adjusting the air flow over the burner until the measured pressure differential equals the predetermined target pressure difference.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
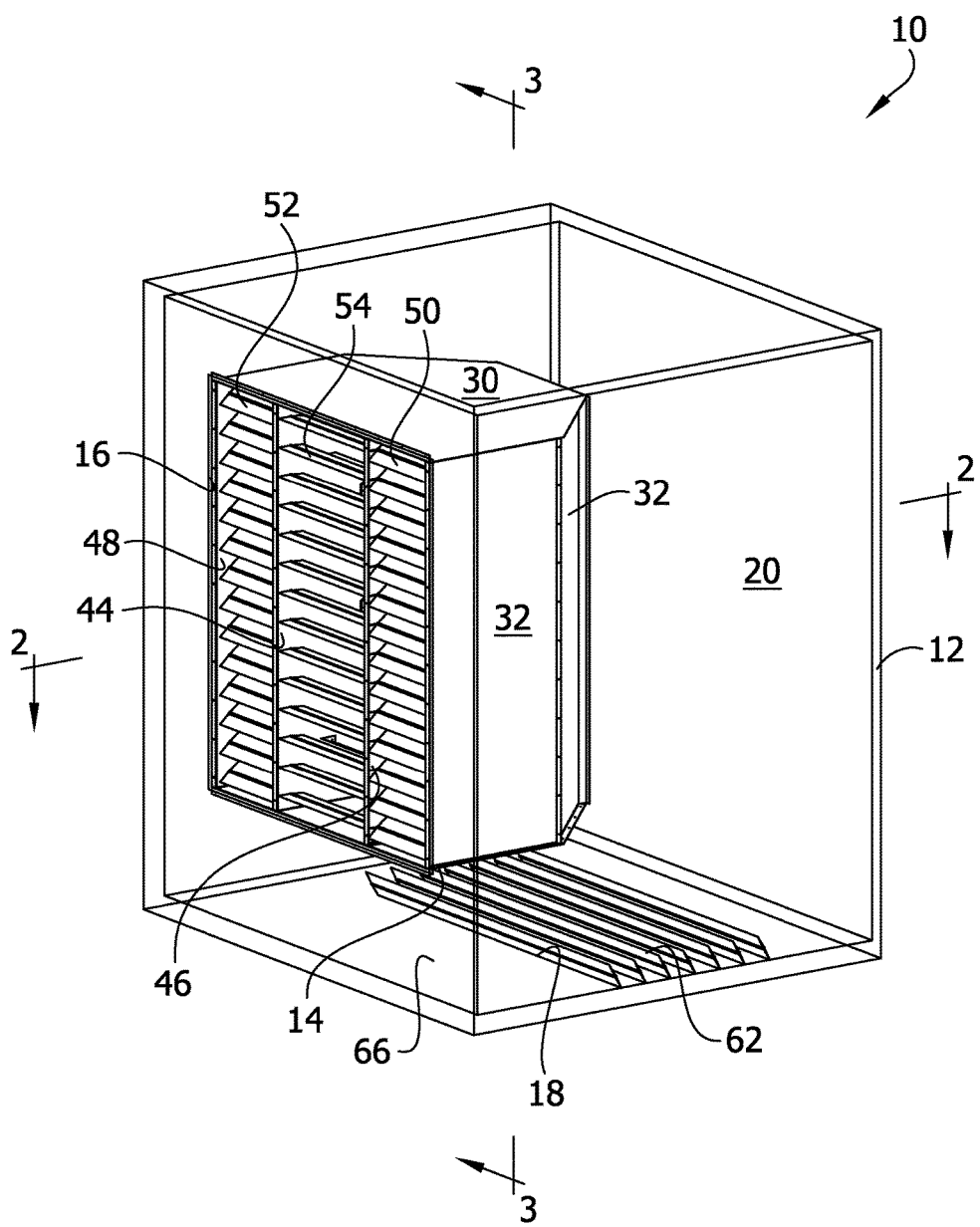
FIG. 1 is a perspective of a heating system including a burner box according to the present invention.
Figure 2:
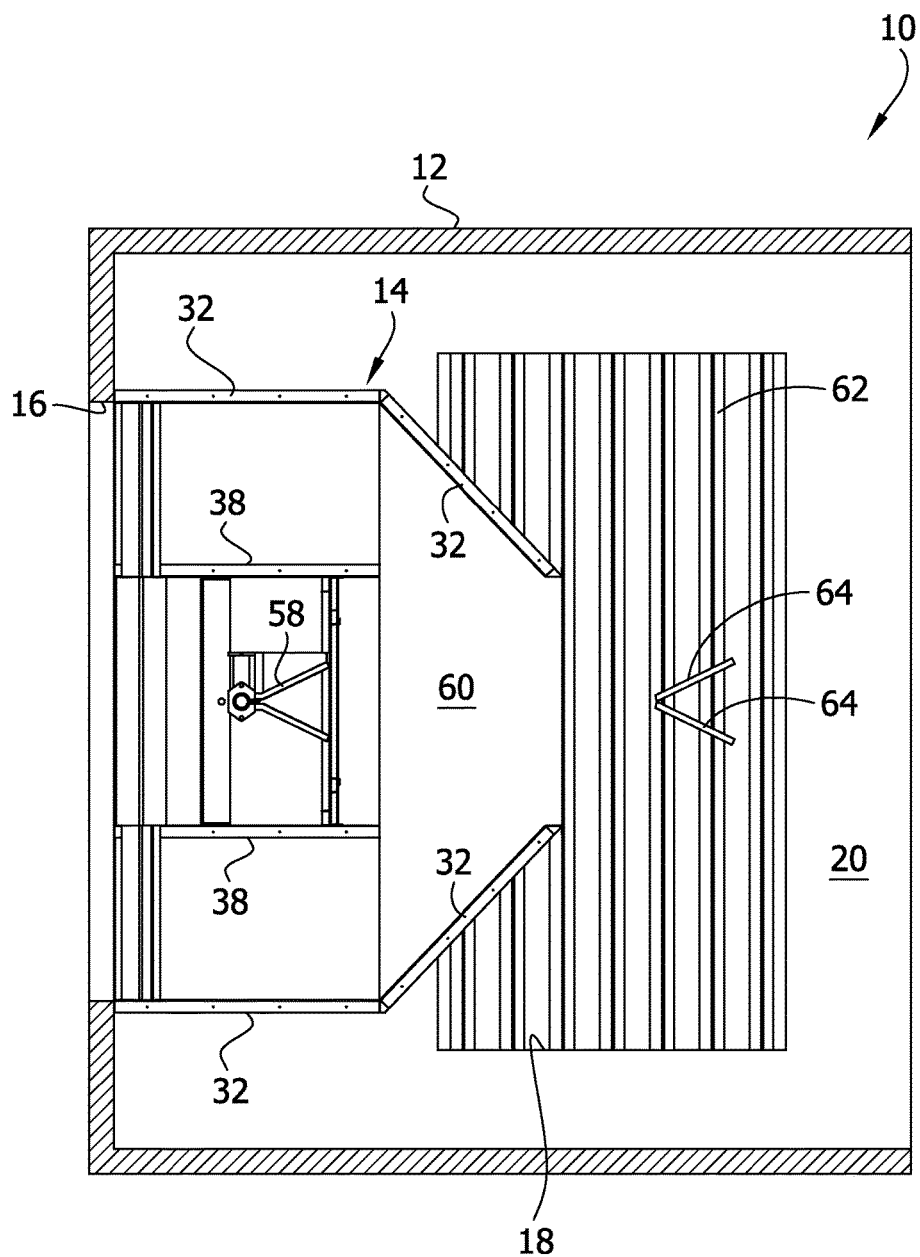
FIG. 2 is a cross section of the heating system taken along line 2-2 of FIG. 1.
Figure 3:
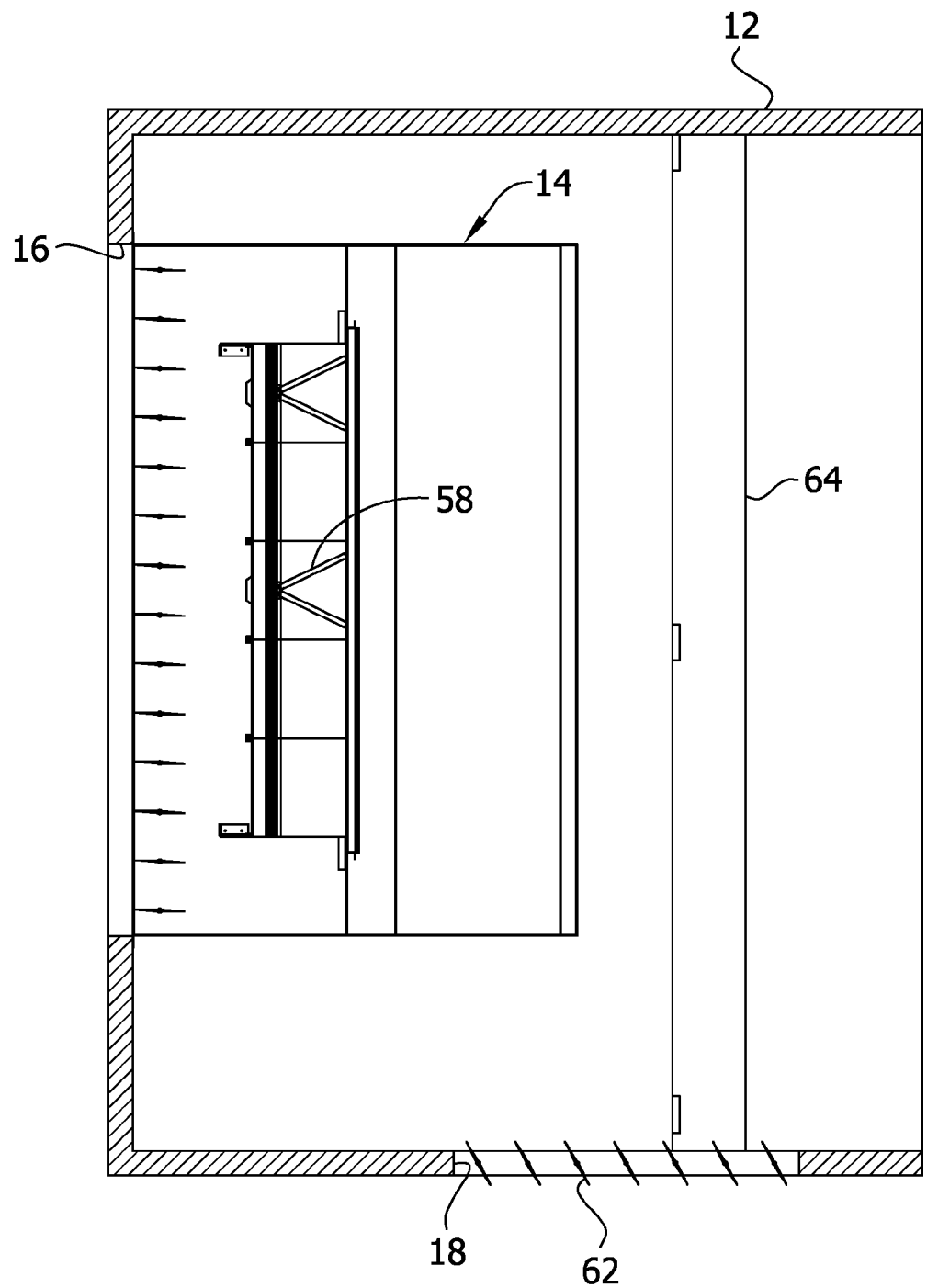
FIG. 3 is a cross section of the heating system taken along line 3-3 of FIG. 1.
Figure 4:
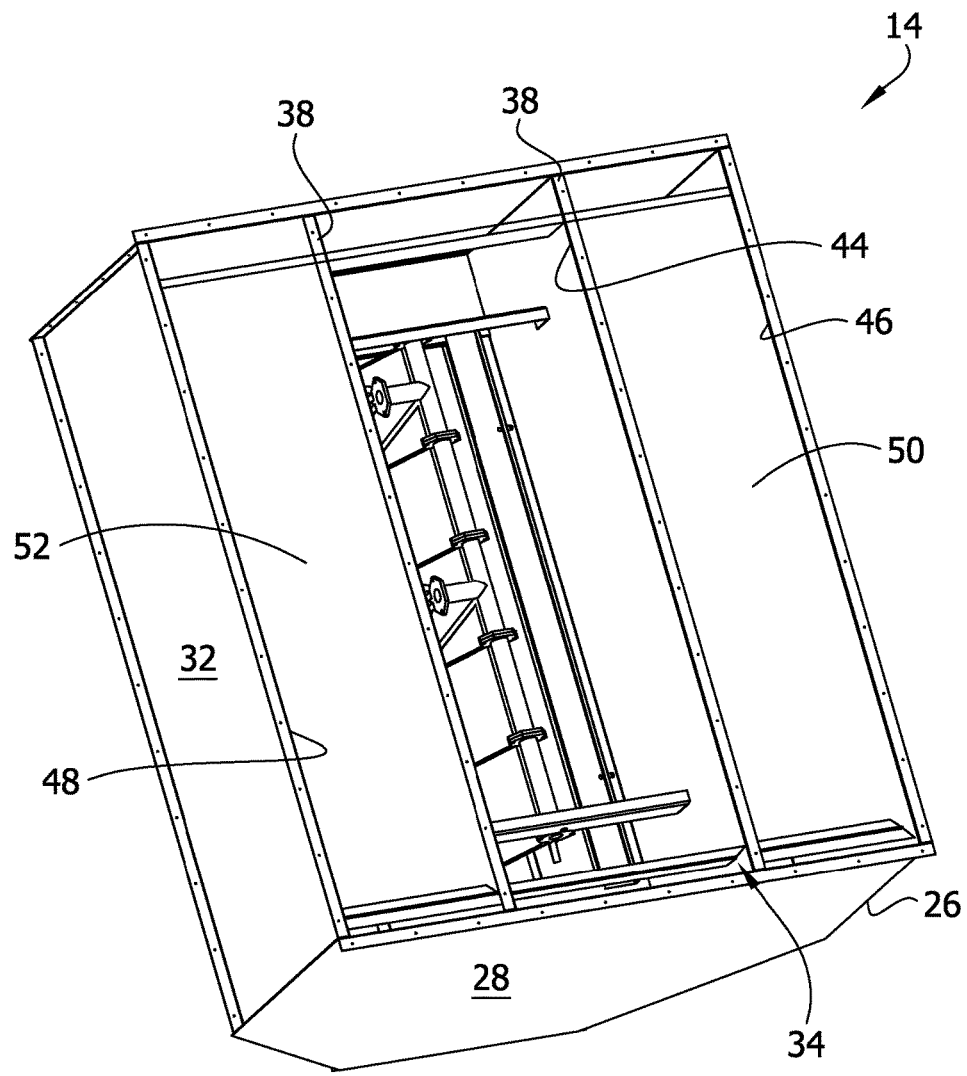
FIG. 4 is a bottom perspective of a burner box according to the present invention.
Figure 5:
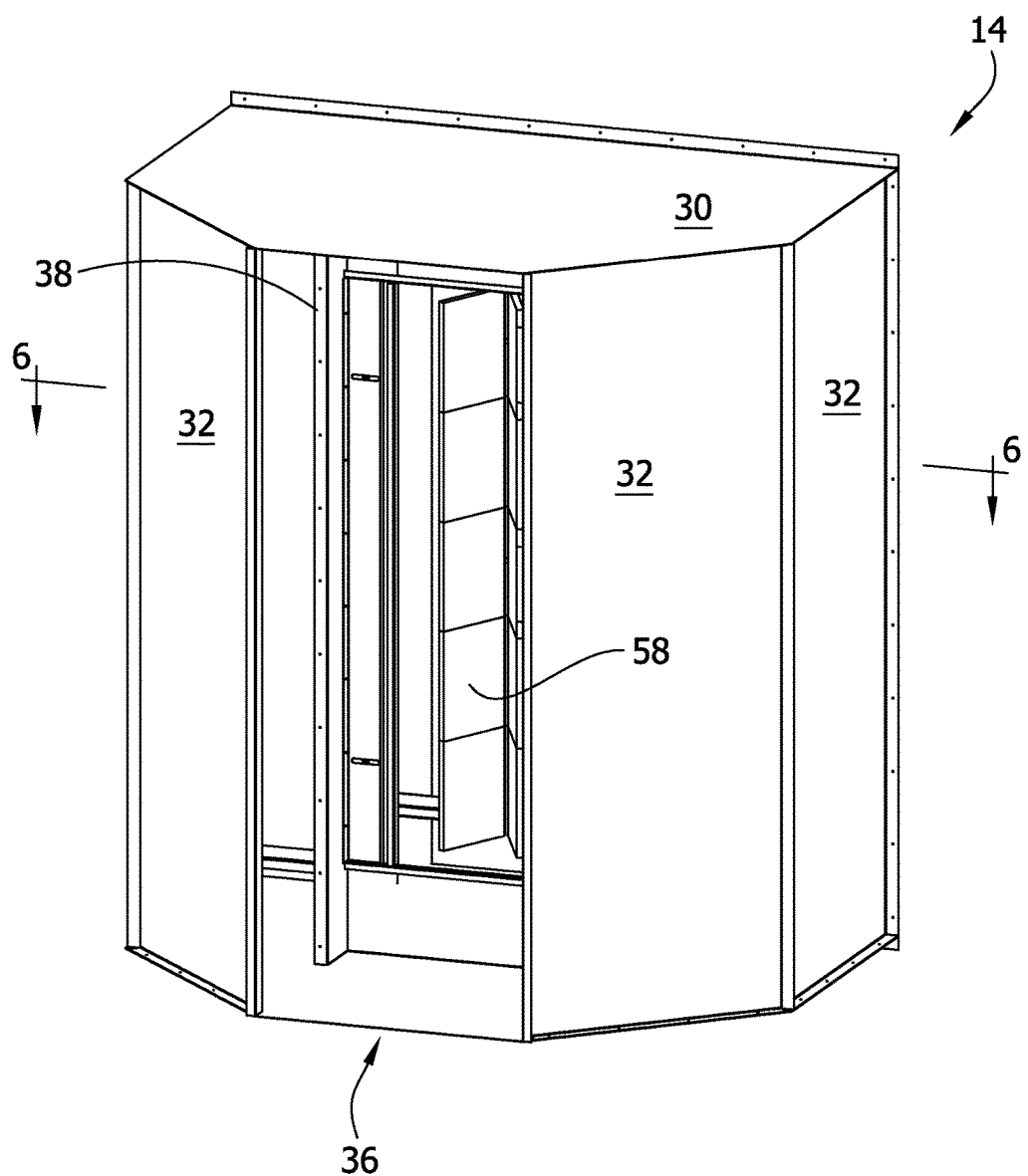
FIG. 5 is a downstream perspective of the burner box.

Referring to FIGS. 1 and 2, an air handling system is generally indicated at 10. The air handling system 10 includes an outer enclosure 12 and a burner box 14 positioned within the outer enclosure. The air handling system 10 can be mounted on the roof of a building (not shown) for supplying and conditioning air entering the building duct system, as is known in the art. Specifically, the air handling system 10 is a recirculating heating and ventilation system that is connected to the ducts of a building. Outside or make-up air enters the air handling system 10 through an outside air opening 16, and recirculated or return air from the building enters the air handling system through a return air opening 18 that is connected to a return air duct (not shown) that recirculates air from the building for mixing with air heated by the burner box 14. The burner box 14 is positioned adjacent the outside air opening 16 of the enclosure 12 such that outside air entering the enclosure must flow through the burner box. The air handling system 10 also includes a fan (not shown) that draws air from a fan chamber 20 and delivers it to the building through a supply duct (not shown). The return air and the outside air are drawn into the fan chamber 20 by the fan and mixed together before being delivered to the building duct system.

The burner box 14 includes a main body 26 having a bottom wall 28 and a top wall 30 opposite the bottom wall. In the illustrated embodiment, the bottom and top walls 28, 30 are generally hexagonal, though other configurations are within the scope of the present invention. Side walls 32 extend between the bottom wall 28 and the top wall 30 and enclose first, second, third, and fourth sides of the burner box 14, leaving an open upstream or front end 34 and an open downstream or rear end 36. Air flows through the burner box 14 from an upstream side adjacent the open front end 34 to a downstream side adjacent the open rear end 36, as illustrated by the arrows A. Intermediate walls 38 extend into the burner box 14 and divide the open front end 34 into three openings. A burner air opening 44 is defined by the intermediate walls 38 and is positioned between a first bypass air opening 46 and a second bypass air opening 48. The first and second bypass air openings 46, 48 are each defined by one of the intermediate walls 38 and the adjacent side wall 32. The main body 26, including the bottom wall 28, the top wall 30, the side walls 32, and the intermediate walls 38 can be made of galvanized sheet steel or other suitable material within the scope of the present invention. The main body 26 of the burner box can be constructed from blanks such as those illustrated in FIG. 7 folded into shape and attached to each other (e.g., by brazing or with mechanical joints or fasteners).

Outside air can be drawn into the burner box through the burner opening 44, the first bypass opening 46, the second bypass opening 48, or any combination thereof. The air flow into the first bypass opening 46 is controlled by a first bypass damper 50, and the air flow into the second bypass opening 48 is controlled by a second bypass damper 52. Preferably, the first and second bypass dampers 50, 52 are always positioned identically, such that the same amount of air enters through both the first and second bypass openings 46, 48. The air flow into the burner opening 44 is controlled by a burner damper 54. When the system is in operation, the burner damper 54 is completely open. The burner damper 54 closes to prevent cold air from entering the air handling system through the burner opening 44 when the system is off.

Outside air that enters the burner box 14 through the burner opening 44 is heated by a direct gas-fired burner 58. Outside air that enters the burner box 14 through either the first bypass opening 46 or the second bypass opening 48 is shunted around the burner 58. Air that is heated by the burner 58 (i.e., the air that enters the burner box 14 through the burner opening 44) is mixed with air that bypasses the burner (i.e., the air that enters the burner box through the first and second bypass openings 46, 48) in a mixing chamber 60 before exiting the burner box through the open rear end 36.

Figure 6:
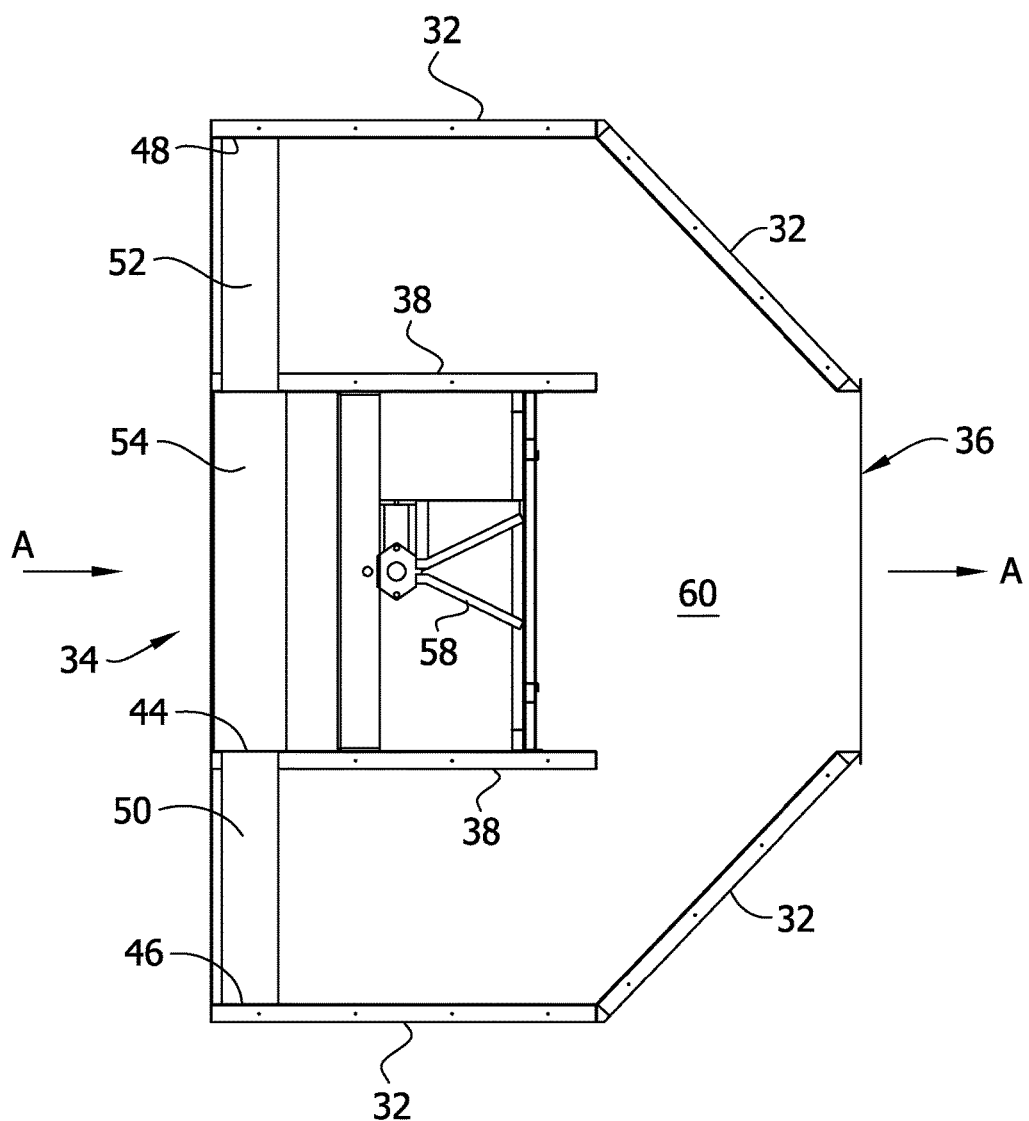
FIG. 6 is a cross section of the burner box taken along line 6-6 of FIG. 5.
Figure 7:
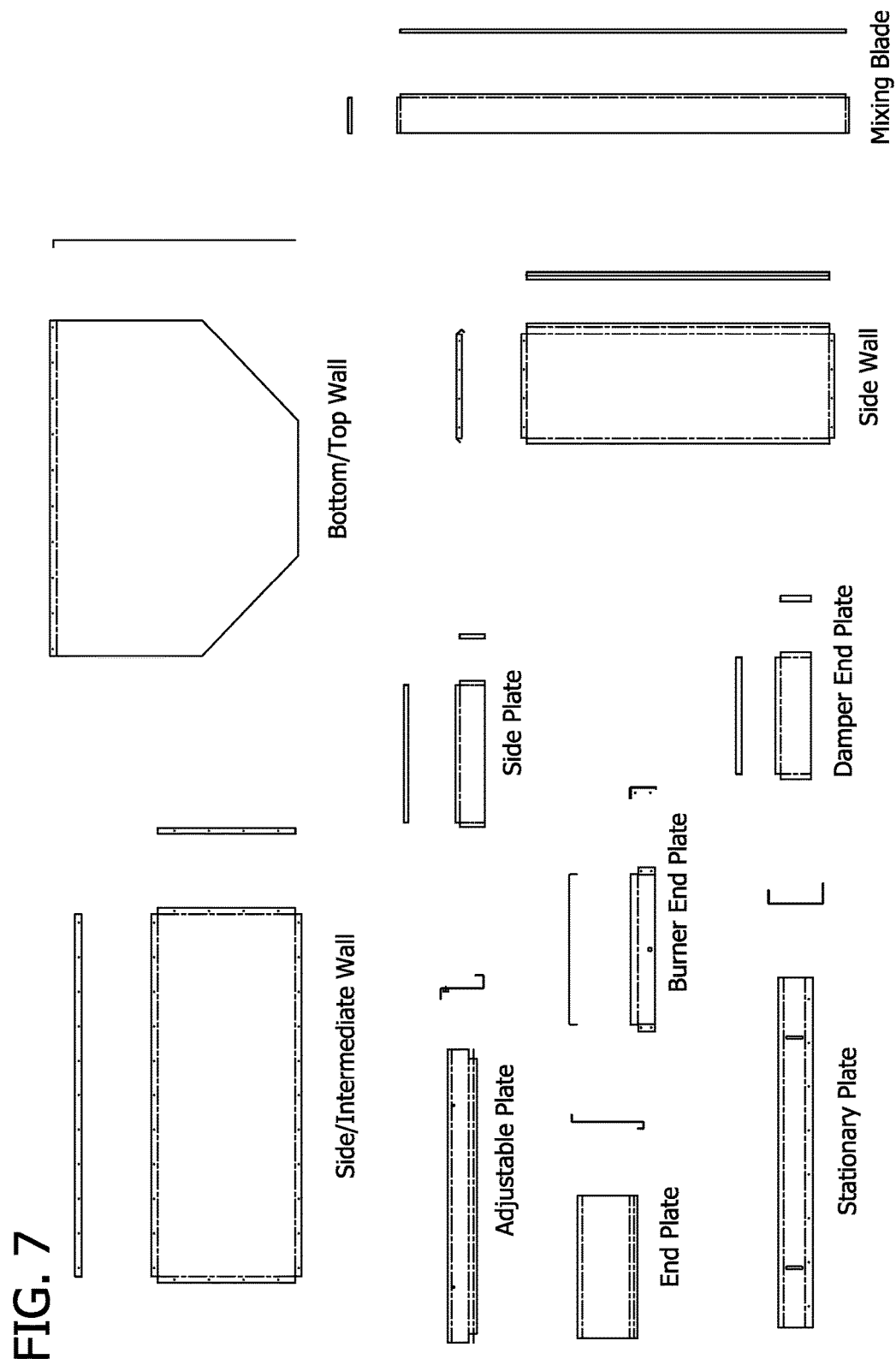
FIG. 7 illustrates blanks that can be used to form the burner box.
Figure 8:
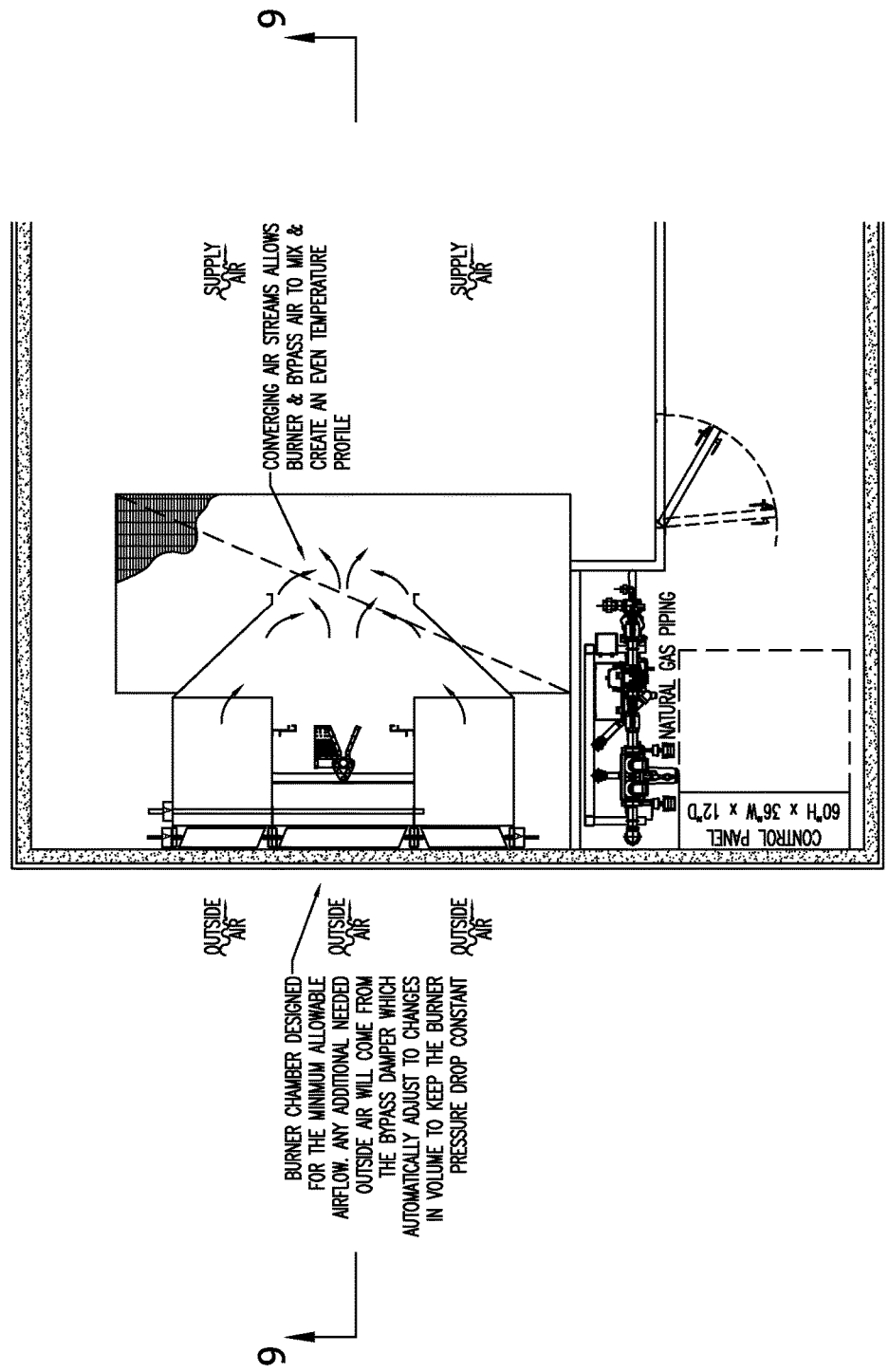
FIG. 8 is a schematic illustrating the flow of air through the burner box and a heating system enclosure.
Figure 9:
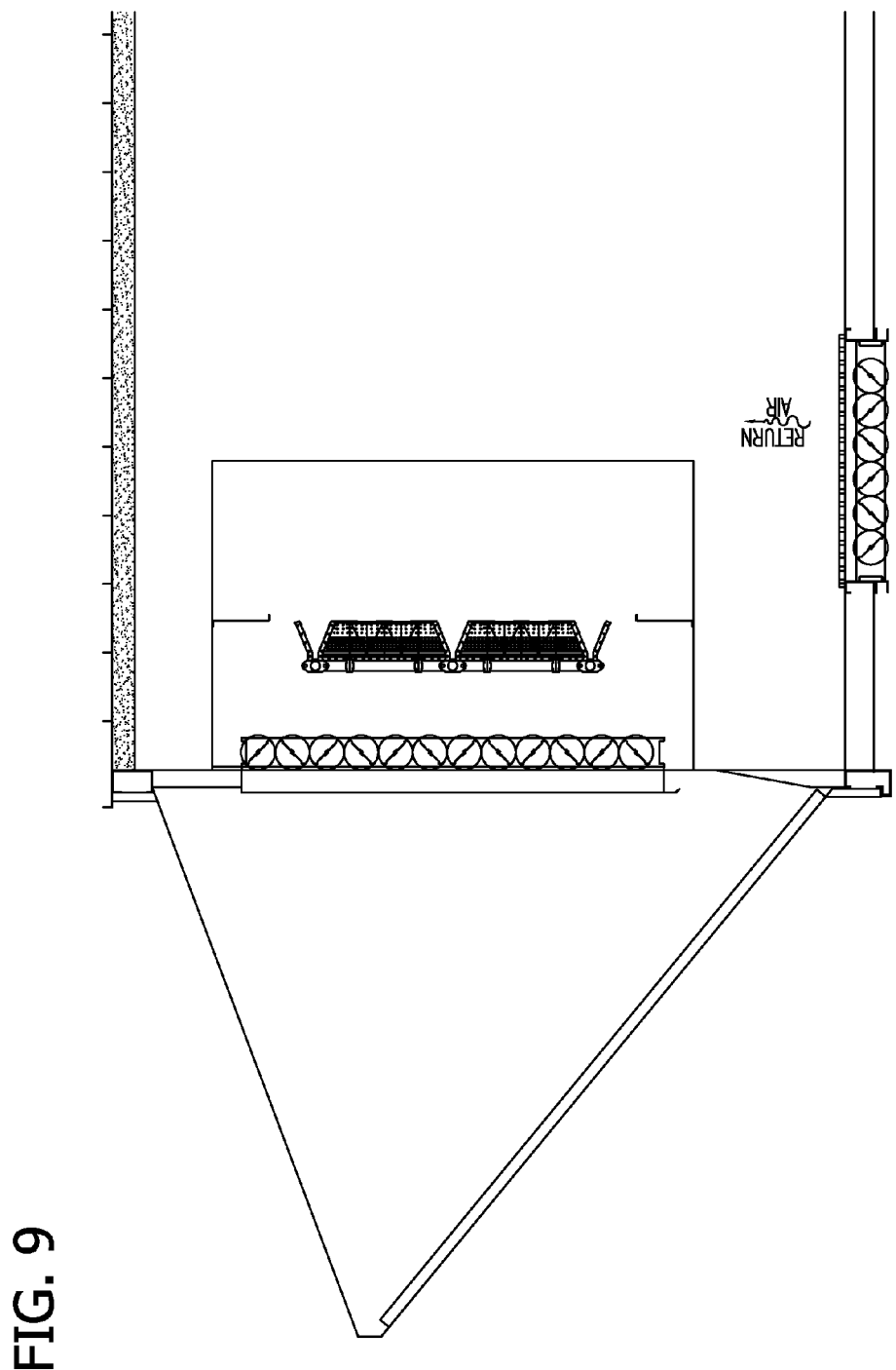
FIG. 9 is a cross section of the heating system enclosure taken along line 9-9 of FIG. 8.

As shown in FIG. 6 and in the schematic diagrams in FIGS. 7 and 8, the bypass air is directed inward by the side walls 32 to converge with the burner air for mixing in the mixing chamber 60. Once the air drawn from outside exits the burner box, it is mixed in the fan chamber 20 with the return air entering through the return air opening 18. The amount of return air entering the return air opening 18 is controlled by a return damper 62. Hingedly mounted mixing blades 64 can be positioned within the enclosure 12 to aid in mixing the return air and the air exiting the burner box 14. In the illustrated embodiment, the return air opening 18 is in a floor 66 of the enclosure 12 so that the return air enters the enclosure transverse to the direction of flow of the outside air through the enclosure. Other configurations are within the scope of the present invention. Preferably, the return air opening 18 is downstream from the open rear end 36 of the burner box 14.

The dual bypass configuration of the burner box 14 promotes better mixing of the burner air and the bypass air and a more even temperature profile for the air handling system. In prior art systems, the burner air, bypass air, and return air all enter the same chamber, and thus are not mixed as well. Cold outside bypass air was not adequately mixed with the heated air and the return air, which can cause the prior art systems to have difficulty properly maintaining an even temperature profile. Furthermore, this cold air entering the system can damage other components downstream. The burner box 14 includes a mixing chamber 60 for the burner air and bypass air to mix within the burner box before the return air is introduced, resulting in better mixing overall.

Figure 10:
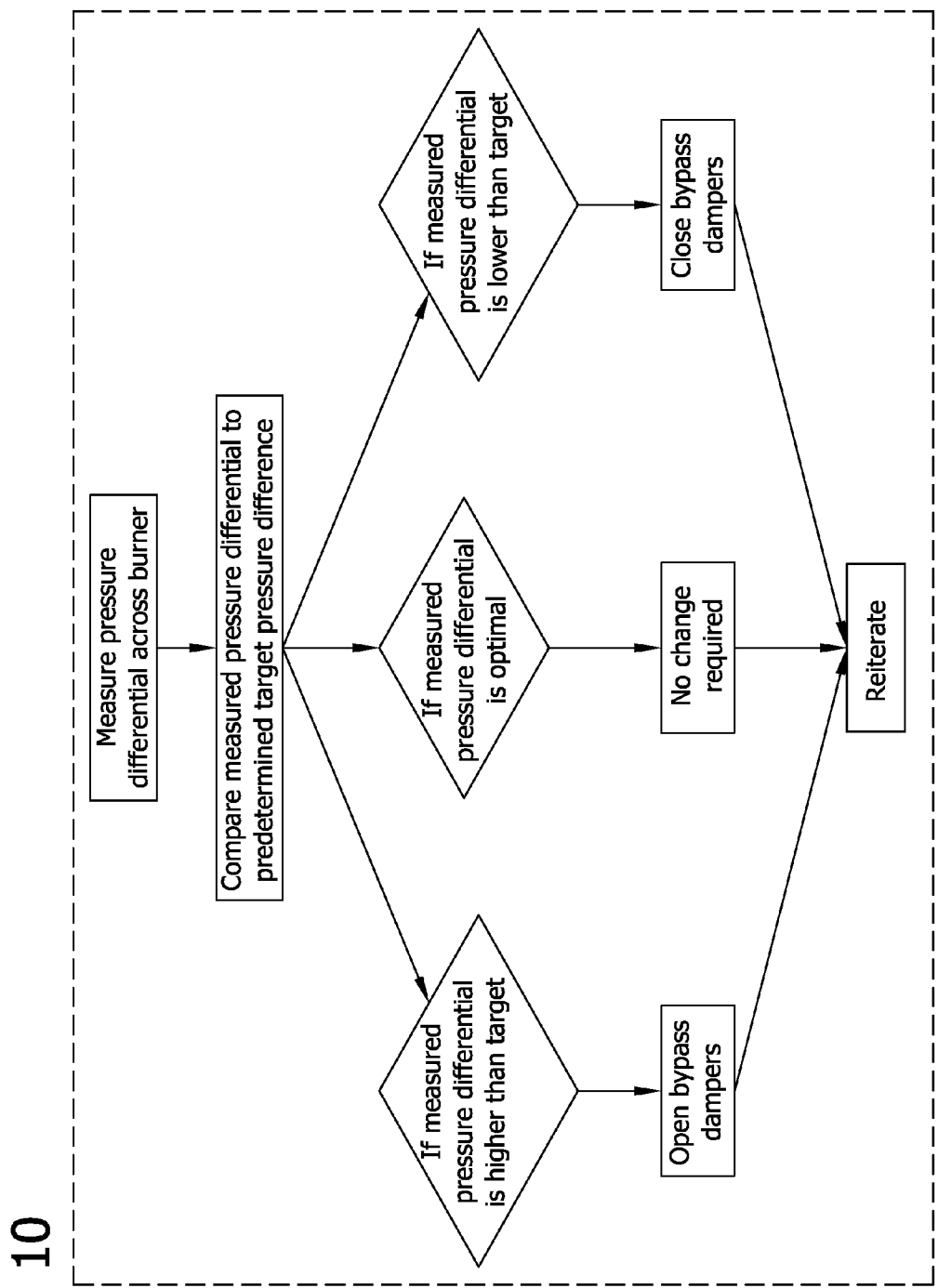
FIG. 10 is a flow chart illustrating the operation of an electronic control system of the present invention.

For proper combustion, the pressure differential across the burner 58 must be maintained at a relatively constant level. The burner 58 is configured to handle a fixed flow rate. The fixed flow rate over the burner 58 is maintained by an electronic control system 72. Operation of the electronic control system 72 is schematically illustrated in FIG. 10. The electronic control system adjusts the first and second bypass dampers 50, 52, thereby adjusting the amount of air entering the first and second bypass openings 46, 48, in response to changes in pressure in order to maintain the constant pressure drop across the burner 58. Ensuring the pressure drop remains fixed at a target pressure difference results in a constant flow rate over the burner 58. Several factors can affect the pressure drop across the burner, such as the amount of outside air chosen to enter the system or the total volume of air chosen to supply to the building. No matter what input is changed, the electronic control system 72 will adjust the bypass dampers 50, 52 accordingly to maintain a constant pressure drop across the burner 58.

For example, a user may decide to alter the amount of return air entering the system. As set out above, the amount of return air is regulated by a return air damper 62. The return air damper is controlled by a separate control system, and is not linked, either mechanically or electronically, to the bypass dampers 50, 52. If the user decreases the amount of return air, the return air controller will close the return air damper 62 so that the amount of return air is decreased to the chosen level. With less return air entering the system, the system will draw more air from the outside to maintain the total amount of air supplied to the building. This will result in too much air being drawn across the burner 58, causing the pressure drop across the burner to be too high. An electronic null switch (not shown) in the burner box 14 senses this change and signals the control system 72 to open the bypass dampers 50, 52 to shunt the excess outside air around the burner 58 until the pressure drop across the burner returns to the correct level corresponding to the fixed flow rate at which the burner is optimized. Similarly, if the user chooses to increase the amount of return air, the null switch will sense that the pressure drop across the burner 58 is too low and will close the bypass dampers 50, 52 until the pressure drop across the burner returns to the correct level.

Because the electronic control system 72 responds to changes in the pressure drop across the burner 58, the control system will work with a variable flow rate system, i.e., controlling the bypass dampers works even if the total air flow supplied to the building changes. For example, the user may decide to alter the total amount of air supplied to the building. If the user decreases the amount of air supplied to the building, the fan drawing air into the building will slow, resulting in less air being drawn across the burner 58, causing the pressure drop across the burner to be too low. Even though less air is required by the system, the burner 58 still requires the same fixed flow rate across it to maintain optimal operation. The electronic null switch senses that the pressure drop across the burner 58 is too low and closes the bypass dampers 50, 52 to force more air across the burner until the flow rate, and thus the pressure drop, across the burner returns to the correct level. Similarly, if the user chooses to increase the total volume of air supplied to the building, the null switch will sense that the pressure drop across the burner 58 is too high and will open the bypass dampers 50, 52 until the pressure drop across the burner returns to the correct level.

The electronic control system 72 also responds to air flow variations caused by other factors. Internal and external factors, such as dirty filters, frost build-up, etc., can affect the flow of air across the burner 58. Regardless of the cause, the electronic control system 72 automatically responds to changes in the pressure drop across the burner 58 and adjusts the bypass dampers 50, 52 accordingly to shunt air around the burner to maintain the correct flow rate and pressure drop across the burner. If the pressure drop across the burner 58 is too low, the electronic control system 72 will close the bypass dampers 50, 52 until the pressure drop across the burner is corrected. If the pressure drop across the burner 58 is too high, the electronic control system 72 will open the bypass dampers 50, 52 until the pressure drop across the burner is corrected.

Prior art air handling systems linked the return air dampers and the bypass dampers such that a change in one resulted in a corresponding and opposite change in the other. However, these prior art systems do not monitor the pressure drop across the burner, and therefore fail to precisely maintain the correct pressure drop across the burner at all times. Attempts to mechanically adjust and maintain the correct pressure drop across the burner have been moderately successful. The pressure drop through an opening is a squared function of the velocity, whereas a weight or spring is a linear function. Therefore, using mechanical means to react to pressure changes is unsuccessful because the mechanical means cannot keep up with the changes in pressure. The electronic null switch of the current invention does not have that issue, and maintains the correct burner pressure precisely throughout the designed operating range.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A heating system for use in conditioning air in a building by supplying air to a duct system of the building, the heating system comprising:
   an enclosure having an outside air opening for drawing outside air into the enclosure and a return air opening for drawing return air from within the building into the enclosure;
   a burner box positioned in the enclosure adjacent the outside air opening such that air flowing into the enclosure through the outside air opening must pass through the burner box, the burner box comprising a direct fired burner for heating at least a portion of air flowing through the outside air opening and flowing over the direct fired burner, the direct fired burner being configured for optimized operation at a predetermined target pressure difference across the burner, the burner box comprising:
   a main body defining an open upstream end and an open downstream end, the open upstream end being divided into a first bypass opening and a second bypass opening spaced from the first bypass opening by a burner opening, the main body further including:
      a mixing chamber adjacent the open downstream end; a first bypass passage extending from the first bypass opening to the mixing chamber;
      a second bypass passage extending from the second bypass opening to the mixing chamber; and
      a burner passage extending from the burner opening to the mixing chamber, the direct fired burner being positioned in the burner passage, such that the burner air flow is drawn into the main body from the outside environment through the burner opening and directed through the burner passage over the direct fired burner for heating,
   wherein air drawn into the main body from the outside environment through the first and second bypass passages is shunted around the burner passage and converges with the heated air from the burner passage in the mixing chamber downstream from the burner passage before exiting the main body through the open downstream end of the main body, the return air opening of the enclosure being positioned outside the main body, the open downstream end of the main body lying within an orthogonal projection of the return air opening projecting orthogonally from the return air opening through the enclosure such that mixed air exiting the mixing chamber through the open downstream end of the main body of the burner box is mixed with the return air entering the enclosure.

2. The heating system of claim 1, wherein the main body further comprises body walls including a top wall, a bottom wall, side walls extending between the top and bottom walls, and intermediate walls extending between the top and bottom walls and positioned between the side walls, the open upstream end of the main body being divided into the first bypass opening, the second bypass opening, and the burner opening by the intermediate walls, the direct fired burner being positioned in the main body between the intermediate walls.

3. The heating system of claim 1, further comprising a first bypass damper positioned for controlling air flow through the first bypass opening and a second bypass damper positioned for controlling air flow through the second bypass opening.

4. The heating system of claim 3 further comprising an electronic control system operatively connected to the burner box, the electronic control system being configured to measure a pressure differential across the direct fired burner and adjust the burner air flow to adjust the pressure differential to achieve the predetermined target pressure difference for optimizing operation of the direct fired burner, wherein the electronic control system adjusts the burner air flow by opening or closing the first and second bypass dampers to control the air flow through the first and second bypass openings.

5. The heating system of claim 4, wherein when the pressure differential across the direct fired burner is below the predetermined target pressure difference, the electronic control system closes at least one of the first and second bypass dampers to reduce air flow through the first and second bypass openings until the pressure differential across the burner is equal to the predetermined target pressure difference.

6. The heating system of claim 4, wherein when the pressure differential across the direct fired burner is above the predetermined target pressure difference, the electronic control system opens at least one of the first and second bypass dampers to increase air flow through the first and second bypass openings until the pressure differential across the burner is equal to the predetermined target pressure difference.

7. The heating system of claim 1, further comprising a return air damper positioned at the return air opening and at least one mixing blade positioned in the enclosure downstream from the return air damper and downstream from the burner box for mixing the return air and the air exiting the burner box, the at least one mixing blade being hingedly mounted within the enclosure.

8. The heating system of claim 1, further comprising a return air damper positioned for controlling air flow through the return air opening from the building.

9. The heating system of claim 2, wherein at least two body walls of the main body converge toward each other downstream from the burner to form the mixing chamber.

10. The heating system of claim 1, wherein the return air opening is positioned in a floor of the enclosure and configured to direct the return air entering the enclosure in a direction transverse to a direction of heated air exiting the burner box.

11. The heating system of claim 1, wherein the return air opening of the enclosure is positioned at least partially downstream from the open downstream end of the main body of the burner box.

12. The heating system of claim 1 wherein the heating system is self-contained and constructed for mounting on a roof of the building and exterior to the duct system of the building, the enclosure of the heating system being configured for connection to the duct system of the building by connecting the duct system to the return air opening.

* * * * *